US010000067B2

(12) United States Patent
Nakagawa et al.

(10) Patent No.: US 10,000,067 B2
(45) Date of Patent: Jun. 19, 2018

(54) INK, INKJET RECORDING METHOD, AND INKJET RECORDED MATTER

(71) Applicants: Tomohiro Nakagawa, Kanagawa (JP); Noriaki Okada, Kanagawa (JP); Hikaru Kobayashi, Kanagawa (JP)

(72) Inventors: Tomohiro Nakagawa, Kanagawa (JP); Noriaki Okada, Kanagawa (JP); Hikaru Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/236,858

(22) Filed: Aug. 15, 2016

(65) Prior Publication Data

US 2017/0051170 A1    Feb. 23, 2017

(30) Foreign Application Priority Data

Aug. 22, 2015   (JP) .................. 2015-164300
Aug. 5, 2016    (JP) .................. 2016-154125

(51) Int. Cl.
| | | |
|---|---|---|
| *B41J 2/21* | (2006.01) | |
| *C09D 11/38* | (2014.01) | |
| *C09D 11/102* | (2014.01) | |
| *C09D 11/322* | (2014.01) | |
| *B41M 7/00* | (2006.01) | |
| *B41J 11/00* | (2006.01) | |

(52) U.S. Cl.
CPC ............ *B41J 2/2107* (2013.01); *B41M 7/009* (2013.01); *C09D 11/102* (2013.01); *C09D 11/322* (2013.01); *C09D 11/38* (2013.01); *B41J 11/002* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | | |
|---|---|---|---|
| 2007/0197685 A1* | 8/2007 | Aruga ................. | C09D 11/322 523/160 |
| 2010/0086685 A1* | 4/2010 | Mizutani ............... | C09D 11/38 106/31.13 |
| 2011/0057981 A1* | 3/2011 | Aruga ................. | C09D 11/322 347/20 |

(Continued)

FOREIGN PATENT DOCUMENTS

| | | |
|---|---|---|
| JP | 10-072562 | 3/1998 |
| JP | 2005-220352 | 8/2005 |

(Continued)

*Primary Examiner* — Manish S Shah
(74) *Attorney, Agent, or Firm* — Oblon, McClelland, Maier & Neustadt, L.L.P.

(57) ABSTRACT

Ink includes water, an organic solvent, a surfactant including a silicon-based surfactant, and a resin including a polyester-based urethane resin having a polyolefin portion.

10 Claims, 2 Drawing Sheets

(56) References Cited

U.S. PATENT DOCUMENTS

| | | | |
|---|---|---|---|
| 2013/0057616 A1* | 3/2013 | Hirata | B41M 5/0023 347/100 |
| 2013/0286069 A1* | 10/2013 | Aoyama | B41J 2/21 347/9 |
| 2014/0204156 A1* | 7/2014 | Gotou | B41J 2/01 347/100 |
| 2014/0267520 A1 | 9/2014 | Toda et al. | |
| 2014/0377516 A1 | 12/2014 | Toda et al. | |
| 2015/0017396 A1 | 1/2015 | Nakagawa et al. | |
| 2015/0050467 A1 | 2/2015 | Nakagawa et al. | |
| 2015/0077479 A1 | 3/2015 | Nakagawa et al. | |
| 2015/0077482 A1 | 3/2015 | Toda et al. | |
| 2015/0116433 A1 | 4/2015 | Fujii et al. | |
| 2015/0138284 A1 | 5/2015 | Nagashima et al. | |
| 2015/0165787 A1 | 6/2015 | Fujii et al. | |
| 2015/0191614 A1 | 7/2015 | Nagashima et al. | |
| 2015/0258783 A1 | 9/2015 | Toda et al. | |
| 2015/0259553 A1 | 9/2015 | Nakagawa et al. | |
| 2015/0329731 A1 | 11/2015 | Fujii et al. | |
| 2015/0361282 A1 | 12/2015 | Nakagawa et al. | |
| 2015/0368492 A1 | 12/2015 | Fujii et al. | |
| 2016/0032122 A1 | 2/2016 | Toda et al. | |
| 2016/0068697 A1 | 3/2016 | Toda et al. | |
| 2016/0102220 A1 | 4/2016 | Kido et al. | |
| 2016/0264808 A1 | 9/2016 | Kido et al. | |
| 2016/0272834 A1 | 9/2016 | Kobayashi et al. | |
| 2017/0022380 A1 | 1/2017 | Nakagawa et al. | |

FOREIGN PATENT DOCUMENTS

| | | |
|---|---|---|
| JP | 2010-116459 | 5/2010 |
| JP | 2011-094082 | 5/2011 |
| JP | 2012-148491 | 8/2012 |

* cited by examiner

INK, INKJET RECORDING METHOD, AND INKJET RECORDED MATTER

CROSS-REFERENCE TO RELATED APPLICATIONS

This patent application is based on and claims priority pursuant to 35 U.S.C. § 119 to Japanese Patent Application Nos. 2015-164300 and 2016-154125, filed on Aug. 22, 2015 and Aug. 5, 2016, respectively, in the Japan Patent Office, the entire disclosures of which are hereby incorporated by reference herein.

BACKGROUND

Technical Field

The present invention relates to ink, an inkjet recording method, and inkjet recorded matter.

Description of the Related Art

Since inkjet printers are relatively quiet, enjoy low running costs, and are capable of printing color images with ease, they are now widely used at home as an output device of digital signals.

Technologies of printing images on packaging materials for food, beverages, commodities, etc., which utilize inkjet have also been developed.

For such usage, non-porous recording media such as plastic film are used and ink for such media have been developed. In the case of most of such packaging materials, generally, images, texts, etc. are printed first on the rear side of a plastic film and thereafter an adhesive is applied to the printing layer and a heat sealable film is attached to the printing layer to obtain a laminate packaged article. However, in the case of a package of fruit and bread, a packaging material having a plastic film surface on which images, texts, etc. are directly printed is popular in terms of reduction of packaging cost.

In the latter case (so-called front surface printing), the printing layer directly contacts, for example, the printing layer of an adjacent packaged material or a box and scraped by abrasion therebetween, which may cause the printing unclear. Therefore, abrasion resistance is demanded for such printing.

Therefore, practically-usable ink for direct printing on the surface of a plastic film is mostly a two-liquid curable type, a UV curable type, or a vehicle type using an organic solvent which is expected to have at least slight permeability to a plastic film substrate.

These types of ink have problems about process, facility, and handling of harzardous material. Also, it may cause health problems.

Therefore, a single liquid type ink requiring no curing treatment is proposed which is capable of forming a strong film on the surface of plastic film while it is not solvent type ink (including a monomer solvent) but an aqueous type.

For example, inkjet ink is proposed which includes polymer colloid particles formed by partially copolymerizing a monomer containing an acid functional group such as (meth)acrylic acid and carbon black pigment particles graft-bonded with a second polymer by the ftuictional group on the surface in an aqueous liquid vehicle including a cosol vent having a boiling point of 285 degrees C. or lower accounting for 50 percent by mass or less.

In addition, aqueous inkjet ink is proposed which includes a copolymerized resin synthesized from monomers including methyl methacrylate, an acid monomer, an acrylic acid alkyl ester having an alkyl group having 2-4 carbon atoms, and an acrylic acid alkyl ester having an alkyl group having 6-12 carbon atoms, a pigment, water, a water-soluble organic solvent, and a silicone-based or fluoro surfactant. The copolymerized resin is an acrylic resin having an acid value of 50-120 mgKOH/g, a glass transition temperature (Tg) of 30-110 degrees C., and a mass average molecular weight (Mw) of 20,000-80,000.

Coverage film formed of acrylic resin ink or paint is known to impart gloss and sharp colors. However, such coverage film is disadvantageous in terms of flexibility of the film and attachability with an undercoating layer.

Also, aqueous ink is provided which uses as an emulsion of chlorinated polypropylene or a copolymer of polypropylene and acrylic as a binder resin. Basically, this uses an acrylic-based resin.

To improve attachability with the undercoating layer, an aqueous paint having durability is mainly introduced which uses polyurethane-based resin instead of an acrylic resin. This is currently the main stream of durable aqueous paint and applied to ink to the present day.

Of plastic film for soft packaging, polypropylene (PP) film is mainly used. Since polypropylene is an inexpensive material having excellent properties with regard to formability, chemical resistance, heat resistance, etc., stable increase in demand for propylene film is expected in the future. However, unlike a synthesis resin having a polarity, polypropylene is a non-polarized and crystal material. Therefore, aqueous ink is easily repelled thereon, which makes forming images on such a film difficult.

SUMMARY

According to the present disclosure, provided is an improved ink which includes water, an organic solvent, a surfactant including a silicon-based surfactant, and a resin including a polyester-based urethane resin having a polyolefin portion,

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
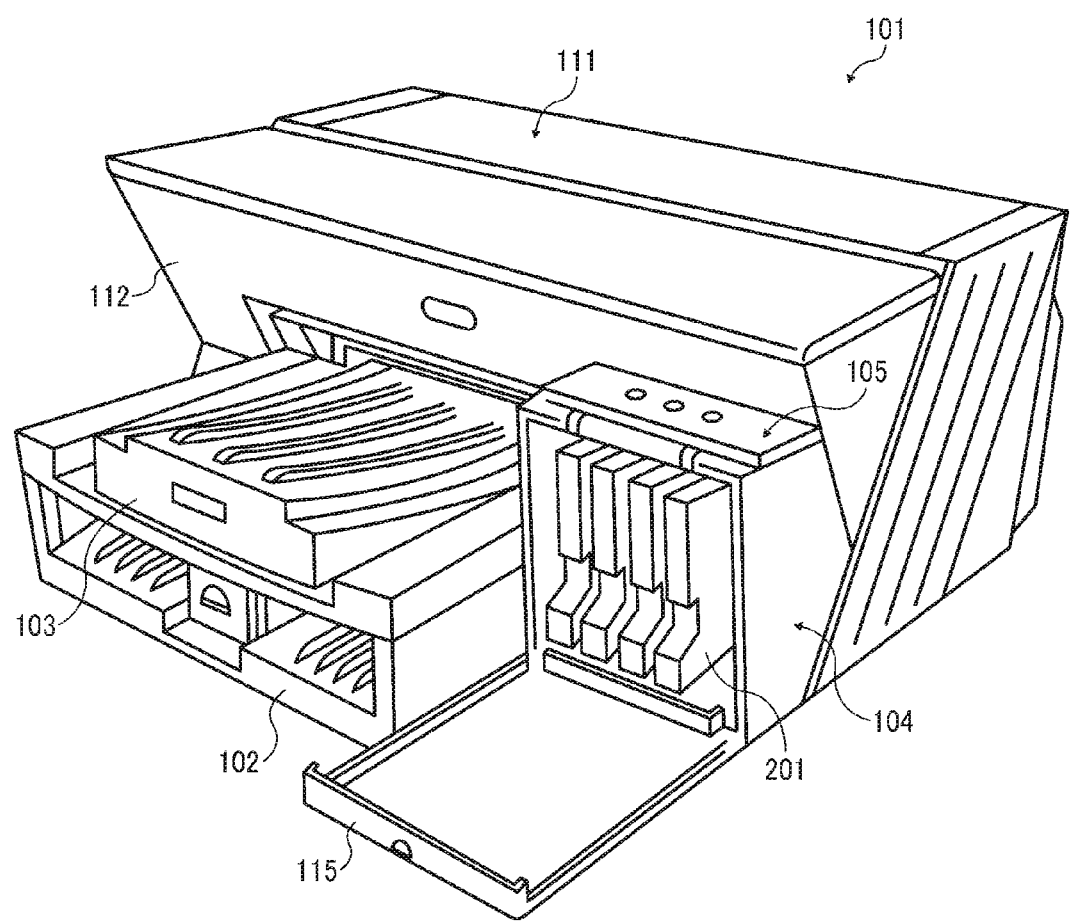
FIG. 1 is a schematic diagram illustrating an example of a serial type inkjet recording device according to an embodiment of the present invention.

The accompanying drawings are intended to depict example embodimentsof the present invention and should not be interpreted to limit the scope thereof. The accompanying drawings are not to be considered as drawn to scale unless explicitly noted.

DESCRIPTION OF THE EMBODIMENTS

The ink of the present disclosure will be described below in detail with reference to several embodiments and accompanying drawings.

One aspect of the present disclosure is ink including water, an organic solvent a surfactant including a silicon-based surfactant, and a resin including a polyester-based urethane resin having a polyolefin portion.

Embodiments of the present disclosure include the following 2 to 10 of ink, inkjet recording method, and inkjet recorded matter. Therefore, these are also described.

2. The ink according to 1 mentioned above, further including a coloring material.

3. The ink according to 1 or 2 mentioned above, wherein the polyester-based urethane resin having a polyolefin portion is particulate.

4. The ink according to any one of 1 to 3 mentioned above, wherein the ratio of the silicone-based surfactant is 0.05-5 percent by mass to the total amount of the ink.

5. The ink according to any one of 1 to 4 mentioned above, wherein the organic solvent includes at least one of 1,2-propane diol, 1,2-butane diol, and 2,3-butane diol.

6. The ink according to any one of 1 to 5 mentioned above, wherein the proportion of the polyester-based urethane resin having a polyolefin portion as a solid portion accounts for 1-9 percent by mass of the total amount of the ink.

7. The ink according to any one of 1 to 6 mentioned above, wherein the ink is used for inkjet.

8. An inkjet recording method includes applying thermal energy or mechanical energy to the ink of any one of 1 to 7 mentioned above to discharge the ink of any one of 1 to 7 mentioned above to a recording medium to print an image thereon.

9. The inkjet recording method according to 8 mentioned above, further including heating the recording medium after the image is printed.

10. Inkjet recorded matter includes a coloring material, a silicone-based surfactant, and a polyester-based urethane resin having a polyolefin portion.

Of plastic film for soft packaging, polypropylene (PP) film is mainly used. Since polypropylene is an inexpensive material having excellent properties with regard to formability, chemical resistance, heat resistance, etc., stable increase in demand for propylene film is expected in the future. However, unlike a synthesis resin having a polarity, polypropylene is a non-polarized and crystal material. Therefore, aqueous ink is easily repelled thereon, which makes forming images on such a film difficult.

The present inventors made a research about surfactants having good wettability on PVC and PET with no side effect.

As a result, wettability of hydrocarbon-based surfactants were found to be insufficient regardless of the addition amount. In addition, since fluoro surfactants have excessive wettability, blurring occurs on color border sites. Although blurring can be reduced if the addition amount is decreased, discharging from a head is unstable.

As a result of this investigation, the present inventors have found that silicone-based surfactants are suitable.

However, it was also found that it was not possible to sufficiently fill a solid image with the ink on a PP material because silicone-based surfactants do not have sufficient wettability thereto.

As a result of investigations made on various materials added to ink to solve this problem, was found that a resin emulsion was able to control wettability to a substrate.

That is, it was found that if a resin had a molecular backbone similar to that of a target substrate, wettability of the resin became better.

Although this mechanism is not clear, it is inferred such that the resin easily spreads because surface tension between the ink and the base material is lowered.

In terms of affinity to a substrate, polyolefin resins are most suitable. However, since hardness of coated polyolefin resin film is low due to its structure, robustness of printed matter is extremely inferior.

The present inventors have found that polyester-based urethane resins having olefin portions in which an olefin backbone is incorporated into a polyester-based urethane resin are excellent to strike a balance between hardness of coated film and promotion of wettability.

In addition, the addition amount of the silicone-based surfactant is preferably 0.05-5 percent by mass to the total amount of ink containing the particular resin mentioned above and more preferably 0.1-3 percent by mass. Also, the range of 0.5-5 percent by mass is particularly suitable because wettability to various substrates becomes optimal, which contributes to improvement on image quality.

Moreover, when the organic solvent includes at least one of 1,2-propane diol, 1,2-butane diol, and 2,3-butane diol, the film-formability of a resin is particularly improved so that abrasion resistance ameliorates.

Furthermore, if utilizing a recording method including a heating step after printing, film-forming of a resin contained in ink is promoted, which contributes to further improvement of robustness of printed matter, The compositions of the ink of the present disclosure are described next.

The ink of the present disclosure includes at least water, an organic solvent, and a resin. The ink may furthermore optionally include a coloring material.

Coloring Material

Pigments and dyes can be used as the coloring materials for use in an inkset relating to the present disclosure. Pigments are preferable to obtain a highly-durable coverage area. As inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As organic pigments, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofumnone pigments, etc), dye chelates (basic dye type chelates, acid dye type chelates), nitro pigments, nitroso pigments, and aniline black can be used.

Of these pigments, pigments having good affinity with solvents are preferable.

In addition to the pigments mentioned above, hollow resin particles can be used as a coloring material for white ink. The hollow resin particles have no particular limitation and any known resin particles can be used.

Specific examples of the hollow resin particles available on the market include, but are not limited to, as styrene-acrylic resins, MH5055 (all manufactured by Zeon Corporation) and ROPAQUE™ OP-62, ROPAQUE™ OP-84J, ROPAQUE™ OP-91, ROPAQUE™ HP-1055, ROPAQUE™ HP-91, and ROPAQUE™ ULTRA (all manufactured by The Dow Chemical Company) and, as cross-linking type styrene-acrylic resins, SX-863(A), SX-864(B), SX-866(A), SX-866(B), and SX-868 (all manufactured by JSR Corporation) and ROPAQUE™ ULTRA E and ROPAQUE™ ULTRA DUAL (both manufactured by The Dow Chemical Company).

There is no specific limitation to dyes. For example, acidic dyes, food dyes, direct dyes, basic dyes, reactive dyes are suitable. These can be used alone or in combination. Specific examples of acidic dyes and food dyes include, but are not limited to, C. I. Acid Yellow 17, 23, 42, 44, 79, and 142; C. I. Acid Red 1,8, 13, 14, 18, 26, 27, 35, 37, 42, 52, 82, 87, 89, 92, 97, 106,111, 114, 115, 134, 186, 249, 254, and 289; C. 1. Acid Blue 9, 29, 45, 92, and 249; C. I. Acid Black 1, 2, 7, 24, 26, and 94; C. I. Food Yellow 3 and 4; C. I. Food Red 7, 9, and 14; and C. I. Food Black 1 and 2.

Specific examples of direct dyes include, but are not limited to, C. I. Direct Yellow 1, 12, 24, 26, 33, 44, 50, 86, 120, 132, 142, and 144; C I. Direct Red1,4,9, 13, 17, 20, 28, 31, 39, 80, 81, 83, 89, 225, and 227; C. I. Direct Orange 26, 29, 62, and 102; C. I. Direct Blue 1, 2, 6, 15, 22, 25, 71, 76, 79, 86, 87, 90, 98, 163, 165, 199, and 202; and C. I. Direct Black 19, 22, 32, 38, 51,56, 71, 74, 75, 77, 154, 168, and 171.

Specific examples of basic dyes include, but are not limited to, C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91; C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112; C. I. Basic Blue 1, 3, 5, 7,9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and C. I. Basic Black 2 and 8.

Specific examples of reactive dyes include, but are not limited to, C. I, Reactive Black 3, 4, 7, 11, 12, and 17; C. I. Reactive Yellow 1,5, 11 13, 14, 20, 21, 22, 25, 40, 47, 51, 55, 65, and 67; C. I. Reactive Red I, 14, 17, 25, 26, 32, 37, 44, 46, 55, 60, 66, 74, 79, 96, 97, and 180; and C. I. Reactive Blue 1, 2, 7, 14, 15, 23, 32, 35, 38, 41, 63, 80, and 95.

In addition, the addition amount of a pigment serving as the coloring material in an ink composition is preferably about 0.1-about 10 percent by mass and more preferably about 1-10 percent by mass. In these ranges, image density is high and image quality is improved.

Preferable specific examples of the pigment for black in the present disclosure include, but are not limited to, carbon black (C.I. Pigment Black 7) such as furnace black, lamp black, acetylene black, and channel black, metals such as copper and iron (C.I. Pigment Black 11), metal compounds such as titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine blue), 15:1, 15:2, 15:3 (Phthalocyanine Blue), 16, 17:1, 56, 60, and 63; C.I. Pigment Green 1, 4, 7, 8, 10, 17, 18, and 36.

In the present disclosure, pigments are stably dispersed in water to form a pigment dispersion, which is added to ink.

To stably disperse a pigment in water, any of known methods is utilized with no limitation.

For example, so-called resin coverage type pigment dispersion in which part or the entire of the surface of a pigment is encapsulated with a polymer, so-called self-dispersion type pigment which is treated by a hydrophilic group imparting agent to make the surface have a hydrophilic group, and so-called active agent dispersion type pigments in which pigments are dispersed by adsorbing the pigment dispersant to the surface are suitable.

Resin

The ink of the present disclosure includes at least a polyester-based urethane resin having a polyolefin portion.

The polyester-based urethane resin having a polyolefin portion has a polyolefin backbone in the main or side chain. The polyester-based resin is obtained by reaction between polyester polyol and polyisocyanate.

Also, urethane resins include polyether-based urethane resins and polycarbonate-based urethane resins. Of these, polyester-based resins are preferable to obtain practically sufficient abrasion resistance.

Olefin-modified polyester-based resins can be manufactured. Alternatively, products available on the market are also usable.

Polyester-based urethane resin having an olefin portion includes a portion of polyester having an olefin portion as a soft segment which is more flexible and a urethane portion which is a hard segment having a strong cohesion energy. So-called sea-island film can be formed where islands of the hard segments are scattered in the sea of the soft segment. Therefore, this urethane resin usable in an aqueous solvent has felxibility, ductility, and elasticity simultaneously due to the balance between both segments and excellent attachabi There is no specific limitation to the method to obtain a newly manufactured polyester-based urethane resin having an olefin portion. For example, it can be synthesized by urethanation reaction between diisocyanate and olefin-modified polyester diol.

That is, the polyester-based urethane resin having an olefin backbone in its main chain can be synthesized by urethanation reaction (reaction formula 1) between diisocyanate (I) and a polyester (II) having an olefin portion. The polyester-based urethane resin having an olefin backbone in its side chain can be synthesized by urethanation reaction (reaction formula 2) between diisocyanate (I) and a polyester (III) having an olefin portion.

In the chemical formula 1, $R_1$ represents a divalent (cyclo)alkyl group or (hetero)aryl group to constitute a known isocyanate, $R_2$ represents an alkylene portion or bisplienol portion having two or more carbon atoms in a did remaining group, and $R_3$ represents an alkylene portion or arylene portion having two or more carbon atoms in dicarboxylic acid. At least one of $R_2$ and $R_3$ is an alkylene portion having three or more carbon atoms. In addition, bisplienol is preferable as the portion having an aryl structure. Bisphenol has a long and thin molecular structure securing rotation capability of an adjacent phenyl ring such as —$CH_2$ or —$C(Me)_2$ and does not inhibit emergence of a flexible structure. This is different from biphenyl having a strong and straight structure in which phenyl rings are directly bonded or stilbene containing —CH=CH— that prevents rotation of adjacent phenyl rings.

In the reaction formula 2, $R_4$ represents an alkylene portion having branch bonding hands having one to six carbon atoms in a diol remaining group or a phenylene group having a branch bonding hand, and $R_5$ represents an alkylene portion or an arylene portion having two or more carbon atoms in dicarboxylic acid, and $R_6$ represents a hydrocarbon group capable of forming a branch flexible portion pendulant from $R_4$ group. This description is only for the puipose of making the present disclosure understood better but not for limiting thereto.

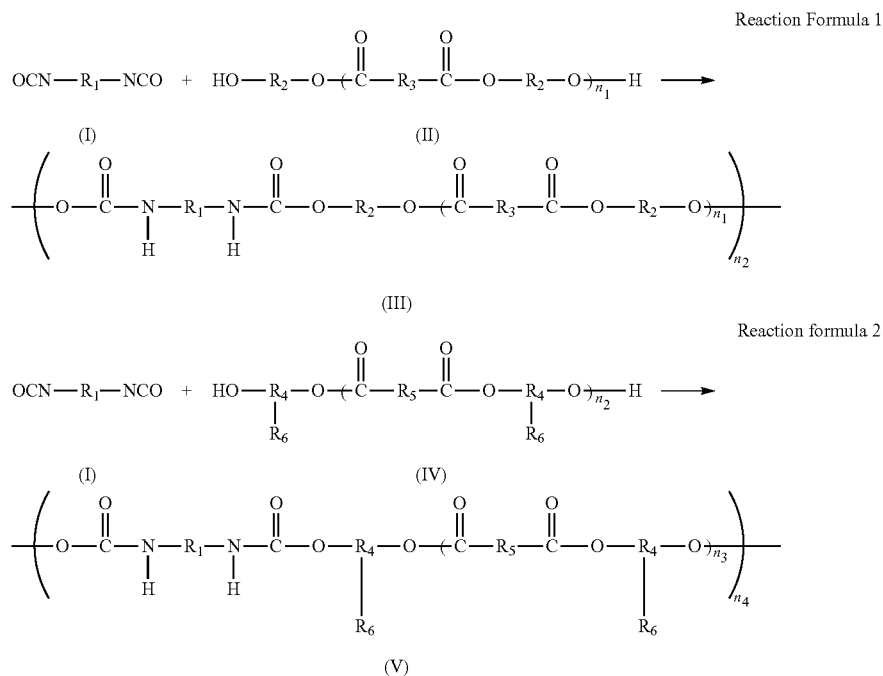

Reaction Formula 1

Reaction formula 2

Practically, the polyester-based urethane resin having an olefin portion can be symhesized by the method disclosed in Japanese Unexamined Patent Application Publication No. H10-72562.

That is, an acid group of a polyurethane resin formed by polyester diol having an olefin portion, another optional polyester did, a polyisocyanate compound, a compound having an acidic group and at least two portions having active hydrogen in its molecule, and a chain elongating agent is nentraliad by ammonium and/or an organic amine, if desired, and dispersed in an aqueous medium.

Each material is described below. Since the nitrogen atom ($N^-$) in au isocyanate group is strongly protonphilic the remaining group where H is extracted bonds with $C^+$ in carbonyl group), urethanation reaction proceeds relatively easily. Also, urethanation reaction is already well known and therefore is briefly described below. Polyester diol used as a raw material is available on the market. The description of synthesizing polyester diol is made considering esterification reaction or esterification substitution reaction is relatively slow.

Polyester Polyol Having Polyolefin Portion

The polyol having a polyolefin portion has a hydroxyl group at both ends and/or in a side chain of the molecule.

There is no specific limitation to the manufacturing method therefor. For example, a method is suitable in which dehydration condensation polymerization or ester substitution reaction is conducted between a compound providing an olefin group and a dicarboxylic acid to obtain a polyester having a hydroxy group at its distal end.

Specific examples of the compound providing an olefin group into the main chain include, but are not limited to, ethylene glycol, diethylene glycol, propylene glycol, dipropylene glycol, polypropylene glycol having a number average molecular weight of less than 500, 1,4-butane diol, 1,3-butanediol, 3-methyl-1,5-pentanediol, 1,6-hexanediol, neopentyl glycol, 2-methyl-1,8-octaned diol, 2,2,4-trimethyl-1,6-hexane diol, 3,3,5-trimethyl-1,6-hexanediol, 1,9-nonane diol, cyclohexyl dimethanol, bis(hydroxyethoxy) benzene, adducts of bisphenols with a small number of mols of ethylene oxide (EO) or propylene oxide (PO) having a number average molecular mass of less than 500, adducts of bisphenol A with ethylene oxide or propylene oxide, bisphenol A, bisphenol F, bisphenol AF, bisphenol E, bishenol M, bisphenol C, and bisphenol S.

Specific examples of the compound providing an olefin group into a side chain include, but are not limited to, 1,2-alkane diol having 5 to 42 carbon atoms such as 1,2-hexanediol, 1,2-octane diol, 1,2-decane diol, 1,2-dodecane diol, and 1,2-octadecane diol, glycerin monoalkyl ether having 6 to 43 carbon atoms such as glycerin monohexyl ether, glycerin monooctyl ether, glycerin mono-2-ethylhexyl ether, glycerin monodecyl ether, glycerin monododecyl ether, and glycerin monooctadecyl ether, and glycerin aliphatic acid monoesters having 7 to 44 carbon atoms such as glycerin hexane acid monoester, glycerin octane acid monoester, glycerin-2-ethyl hexane acid monoester, glycerin decan acid monoester, glycerin dodecane acid monoester, and glycerin octadecane acid monoester, These can be used alone or in combination.

As seen in the reaction formulae illustrated above, these polyols (diols) have diol structures of polyesters having olefin portions. To obtain the diol structure, it is preferable to use the compound in an amount greater than the equivalent amount to dicarboxylic acid in polyesterification reaction with dicarboxylic acid. Taking into account the molecular weight of the polyester having a olefin portion is not so large, it is preferable that the amount be clearly greater than the equivalent amount. It is possible to utilize a one-shot synthesis method. Alternatively, it is possible to utilize a two-shot synthesis method including a first shot for normal polymerization and a second shot to add an extra amount of diol (for hydroxylation of molecular distal end) after the molecular and the acid value monitored have reached almost the target values. This two-shot synthesis method is one of the suitable methods to obtain polyester diol by condensation of hydroxy acid described later.

Specific examples of dicarboxylic acid include, but are not limited to, aliphatic acid dicarboxylic acids having 4 to 10 carbon atoms such as adipic acid, succinic acid, sebacic acid, azelaic acid, fumaric acid, and maleic acid) or ester forming derivatives thereof and aromatic dicarboxylic acid such as phthalic acid, terephthalic acid, and isophthalic acid and ester forming derivatives thereof. These can be used alone or in combination.

Polyester Polyol

As the polyester polyol, for example, it is possible to use a product obtained by esterification reaction between a polyol having a low molecular weight and a polycarboxylic acid, a polyester obtained by a ring-opening polymerization reaction of a cyclic ester compound such as ε-caprolactone, or a copolymerized polyester thereof.

Specific examples of the polyol having a low molecular weight include, but are not limited to, ethylene glycol and propylene glycol.

Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof.

Raw materials and methods of obtaining polyester-based urethane resins in the present disclosure are not limited to the mentioned above. For example, it is known that the polyester portion can be formed by not only reaction between diol and dicarboxylic acid but also condensation of hydroxy acids, each of which has a hydroxy group and a carboxylic group in a single molecule.

Polyisocyanate

There is no specific limitation to the polyisocyanate mentioned above.

Specific examples thereof include, but are not limited to, aromatic polyisocyante compounds such as 1,3-phenylene diisocyanate, 1,4-phenylene diisocyanate, 2,4-tolylene diisocyanate (TDI), 2,6-tolyiene diisocyanate, 4,4'-diphenylene methane diisocyanate (MDI), 2,4-diphenylmethane diisocyanate, 4,4'-diisocynato biphenyl, 3,3'-dimethyl-4,4'-diisocyanate biphenyl, 3,3'-dimethyl-4,4'-diisocyanate diphenyl methane, 1,5-naphtylene diisocyanate, m-isocyanate phenyl sulphonyl isocyanate, and p-isocyanate phenyl sulfonyl isocyanate; aliphatic polyisocyanates compounds such as ethylene diisocyanate, tetramethylene diisocyanate, hexamethylene diisocyanate (HDI), dodecamethylene diisocyanate, 1,6,11-uridecane triisocyanate, 2,2,4-trimethyl hexamethylene diisocyanate, lysine diisocyanate, 2,6-diisocyante methylcaproate, bis(2-isocyanate ethyl)fumarate, bis(2-isocyanateethyl)carbonate, and 2-isocyanate ethyl-2,6-diisocyanate hexanoate; and alicyclic polycyanate compounds such as isophorone diisocyante (IPDI), 4,4'dicyclohexyl methane diisocyanate (hydrogenated MDI), cyclohexylene diisocyante, methylcyclobexylene diisocyanate (hydrogenated TDI), bis(2-isocyanateethyl)-4-dichlorohexene-1,2-dicarboxylate, 2,5-norbornane diisocyante, and 2,6-norbonane diisocyante. These can be used alone or in combination.

Of these, using an aliphatic or alicyclic diisocyanate is preferable in terms of weather resistance for a long period of time.

Compound Having Acidic Group and At Least Two Active Hydrogen Containing Group in Molecule Specific examples of the compound having an acidic group and two or more active hydrogen groups include, but are not limited to, hydroxyl acids such as glycolic acid, tartaric acid, 4,6-dihydroxyisophthlic acid, α,α-dimethylol propionic acid, α,α-dimethylol lactic acid, α,α-dimethylol nonaic acid, and polycaprolactone diol containing a carboxylic group obtained by addition polymerizing caprolactone monomer with these, hydroxysulfonic acid such as 1,7-dihydroxynaphtaline sulfonic acid, and amino sulfonic acid such as 2,4-diamino benzene sulfonic acid.

Of these, preferred are α,α-dimethylol propionic acid and α,α-dimethylol lactic acid, each of which has two hydroxyl groups and a single carboxylic acid in a molecule and polycaprolactone diol having a carboxyl group obtained by addition polymerizing a caprolactone monomer with these.

Chain Elongating Agent

In addition, polyamines or other compounds having an active hydrogen atom are used as the chain elongating agent.

Specific examples of polyamine include, but are not limited to, diamines such as ethylene diamine, 1,2-propane diamine, 1,6-hexamethyleriediamine, piperazine, 2,5-dimethyl piperazine, isophoronediarnine, 4,4'-dicyclohexyl methane diamine, and 1,4-cyclohexane diamine, polyamines such as diethylenetriamine, dipropylene triamine, and triethylene tetramine, hydrazines such as N,N'dimethyl hydrazine and 1,6-hexamethylene his hydrazine, and dihydrazides such as succinic dihydrazide, adipic acid dihydrazide, glutalic acid dihydrazide, sebacic acid dihydrazide, and isophthalic acid dihydrazide.

The polyester-based urethane resin particulates having a polyolefin portion for use in the ink of the present disclosure can be manufactured by, for example, the following typical methods.

First, a urethane prepolymer having an isocyanate group at its distal end is prepared under the presence of no solvent or an organic solvent by reacting the two kinds of polyols mentioned above and the polyisocyanate with a ratio in which the isocyanate group is greater than the equivalent ratio.

The ratio of polyester polyol and polyolefin-modified polyol is preferably 60:40 or greater about the portion derived from the polyol in the prepolyrner, more preferably, 80:20 or greater, and furthermore preferably, 90:10 or greater.

Next, optionally the anionic groups in the urethane prepolymer having an isocyanate group at its distal end is neutralized by a neutralizer. Thereafter, subsequent to reaction with a chain elongating agent, the organic solvent in the system is removed to obtain polyester-based urethane resin particulates having a polyolefin portion.

Specific examples of usable organic solvents include, but are not limited to, ketones such as acetone and methyl ethyl ketone; ethers such as tetrahydrofuran and dioxane, acetic acid esters such as ethyl acetate and butylac-tate, nitriles such as acetonitrile, and amides such as dimethyl foiinamide, N-methyl pyrolidone, and N-ethyl pyrolidone. These can be used alone or in combination.

Moreover, a dispersant such as a surfactant can be optionally added to a resin emulsion. In particular, a so-called self-emulsification type emulsion is preferable to easily obtain ink having excellent applied film's perfolinance.

In terms of water dispersability, it is preferable that an anionic group be contained in an acid value range of 5-100 mgKOH/g. To impart excellent abrasion resistance and chemical resistance, it is particularly preferable that the range of the acid value be 5-50 mgKOH/g.

In addition, the anionic group imparts good water dispersibility when using, for example, carboxyl group and sulfonic acid group. To introduce such an anionic group to a resin, it is suitable to use a monomer having such an anionic group.

In addition, with regard to the particle diameter of the resin particulates, considering using these in an inkjet recording device, the volume average particle diameter is preferably 10-1,000 nm, more preferably from 10-500 nm, and furthermore preferably 10-200 nm.

The volume average particle diameter can be measured by using a particle size analyzer (Microtrac MODEL UPA 9340, manufactured by Nikkiso Co., Ltd.).

The proportion of the polyester-based urethane resin particle having a polyolefin portion as a solid portion accounts for 0.1-15 percent by mass of the total amount of the ink, more preferably, 1-9 percent by mass, and furthermore preferably, 5-9 percent by mass. The content of the resin particle is more preferably 1-9 percent by mass in the total content of ink and furthermore preferably 5-9 percent by mass in terms of ink fixability, ink stability, improvement of smoothness of the recording layer and high gloss when forming a recording layer using the ink.

The proportion of the polyester-based urethane resin having a polyolefin portion to the silicone-based surfactant is 0.6-90 in mass conversion.

The ink of the present disclosure includes other optional resins in addition to the polyester-based urethane resin having a polyolefin portion.

Specific examples thereof include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Any suitably synthesized resin particulates and products available on the market are also usable. Specific examples of the resin particulates available on the market include, but are not limited to, Microgel E-1002 and E-5002 (styrene-acrylic-based resin particulates, manufactured by Nippon Paint Co., Ltd.), Voncoat 4001 (acrylic-based resin particulates, manufactured by Dainippon Ink and Chemicals, Inc.), Voncoat 5454 (styrene/acrylic-based resin particulates, manufactured by Dainippon Ink and Chemicals, Inc.), SAE-1014 (styrene-acrylic-based resin particulates, manufactured by Nippon Zeon Co., Ltd.), and Saivinol SK-200 (acrylic-based resin particulates, manufactured by Saiden Chemical Industry Co., Ltd.), Primal AC-22 and AC-61 (acrylic-based resin particulates, manufactured by The Dow Chemical Company), NANOCRYL SBCX-2821 and 3689 (acrylic-silicone-based resin particulates, manufactured by Toyo Ink Co., Ltd.), and #3070 (methyl methacrylate polymer resin particulates, manufactured by MIKUNI COLOR LTD.).

Organic Solvent

There is no specific limitation to the organic solvent. Aqueous organic solvents are preferably used.

Specific examples of thereof include, but are not limited to, polyols such as ethylene glycol, diethylene glycol, 1,2-propane diol, 1,3-propane diol, 1,2-butane diol, 1,3-butane diol, 2,3-butane diol, 3-methyl-1,3-butane diol, triethylene glycol, polyethylene glycol, polypropylene glycol, 1,5-pentanediol, 1,6-hexane diol, glycerin, I,2,6-hexane triol, 2-ethyl-1,3-hexane diol, ethyl-1,2,4-butanetriol, 1,2,3-butanetriol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethanolamine; sulfur-containing compounds such as dimethyl sulfoxide, sulfolane, and thiodiethanol; propylene carbonate, and ethylene carbonate.

These can be used alone or in combination.

Of these, in terms of accelerating film-forming of a resin and preventing agglomeration of particles, 1,2-propane diol, 1,2-butane diol, and 2,3-butane diol are particularly preferable to obtain excellent better attachability.

The total amount of the organic solvent in the entire ink is preferably 20-70 percent by mass and more preferably 30-60 percent by mass.

When the total amount is 20 percent by mass or more, ink is not easily dried so that the discharging stability thereof is improved. If the total amount is 70 percent by mass or less, it is possible to subdue viscosity of the ink, thereby making ink discharging easy.

The other compositions of the ink of the present disclosure are described next.

The ink of the present disclosure contains water and an organic solvent, and other optional compositions such as a coloring material, a surfactant, a preservatives and mildew-proofing agent, a corrosion inhibitor, and a pH regnlator.

Surfactant

The ink of the present disclosure includes a silicone-based surfactant.

Preferably, polyether-modified polysiloxane compounds are the silicone-based surfactant for use in the present disclosure in terms of lowering the surface tension of ink and securing excellent wettability of the ink on a highly hydrophobic and non-absorbing substrate. It is preferable to use silicone-based surfactants represented by the following chemical formula 1 or 3.

Chemical formula 1

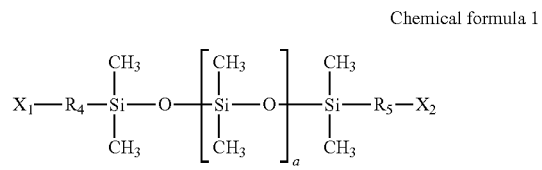

In the Chemical formula 1, $R_4$ and $R_5$ each, independently represent alkyl groups having one to six carbon atoms, $X_1$ and $X_2$ each, independently represent polyether (poloxyalkylene) group represented by the Chemical formula 2. The symbol "a" represents an integer of 10-80.

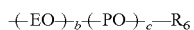

Chemical Formula 2

In the Chemical formula 2, $R_6$ represents a hydrogen atom or an alkyl group or (meth)acrylic group having one to six carbon atoms. EO represents an ethyleneoxide group. PO represents a propyleneoxide group. The symbol "b" is an integer of 1 or greater and the symbol "c" is 0 or an integer of 1 or greater while "b"+"c" is an integer of 1-30. The sequence of EO and PO may be random.

Chemical formula 3

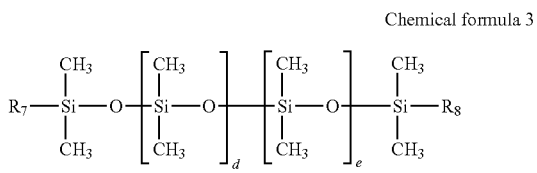

In the Chemical formula 3, $R_7$ and $R_8$ each, independently represent alkyl groups having one to six carbon atoms. $X_3$ represents the polyether (poloxyalkylene) group represented by the Chemical formula 4. The symbols "d" and "e" each, independently represent integers of 1 or greater while "d"+"e" is an integer of 2-50.

Chemical formula 4

In the Chemical formula 4, $R_9$ represents an alkyl group having one to six carbon atoms. $R_{10}$ represents a hydrogen atom or an alkyl group having one to six carbon atoms. EO represents an ethyleneoxide group. PO represents a propylene oxide group. The symbol "f" is an integer of 1 or greater and the symbol "g" is 0 or an integer of 1 or greater while "f"+"g" is an integer of 1-30. The sequence of EO and PO may be random.

Specific examples of the silicone-based surfactant available on the market represented by the Chemical formula 1 include, but are not limited to, BY16-201 and SF8427 (manufactured by Dow Coming foray Co., Ltd.), BYK-333 and BYK-UV3500 (manufactured by BYK Japan KK.), and TEGO GLIDE 410, TEGO GLIDE 432, TEGO GLIDE 435, TEGOGLIDE 440, and TEGO GLIDE 450 (all manufactured by Evonik Industries AG).

Specific examples of the silicone-based surfactant available on the market represented by the Chemical formula 3 include, but are not limited to, SF8428, FZ-2162, 8032 ADDITIVE, SH3749, FZ-77, L7001, L-7002, FZ-2104, FZ-2110, FZ-2123, SH8400, and SH3773M (all manufactured by Dow Coming Toray Co., Ltd.), BYK-345, BYK-346, BYK-347, and BYK-348 (all manufactured by BYK Japan KK.), TEGO WET 250, TEGO WET 260, TEGO WET 270, and TEGO WET 280 (all manufactured by Evonik Industries AG), and KF-351A, KF-352A, KF-353, KF-354L, KF-355A, KF-615A, KF-640, KF-642, and KF-643 (all manufactured by Shin-Etsu Chemical Co., Ltd.).

The silicone-based swfactant represented by the Chemical formula 1 or the Chemical formula 3 can be used alone or in combination.

When a silicone-based surfactant having the structure described above is used, wettability of ink droplets landed on highly hydrophobic and non-absorbing substrate such as PET and PVC can be improved.

The image quality on such a substrate can be improved due to the improvement of wettability. In addition, as wettability improves, ink film becomes smooth, so that excellent print quality with high level of gloss is obtained.

Other Additives

In addition to the ink compositions mentioned above, it is possible to use additives such as preservatives and fungicides, corrosion inhibitors, and pH regulators.

Specific examples of the preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

Specific examples of the corrosion inhibitors include, but are not limited to, acid sulfite, thiosodium sulfate, ammonium thiodiglycolate, diisopropyl ammonium nitrite, pentaerythritol tetranitrate, and dicyclohexyl ammonium nitrite.

Any material capable of adjusting pH to a particular value without an adverse impact on an ink can be the pH regulator. Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassiwn carbonate; hydroxides of quaternaty ammonium, amines such as diethanol amine and triethanol amine; ammonium hydroxide, and hydroxides of quaternary phosphonium.

The ink of the present disclosure is manufactured by dispersing or dissolving the ink composition mentioned above in an aqueous medium followed by optional mixing and stirring.

Typically, a stirrer using a stirring blade, a magnetic stirrer, a high performance disperser etc., can be used for the mixing and stirring.

The ink of the present disclosure is used in any printer having an inkjet head such as a piezoelectric element type in which ink droplets are discharged by transforming a vibration plate constituting the wall of the ink flowing path using a piezoelectric element as a pressure generating device to press the ink in the ink flowing path, a thermal type in which bubbles are produced by heating ink in the ink flowing path with a heat element, and an electrostatic type in which ink droplets are discharged by transforming a vibration plate constituting the wall surface of the ink flowing path by the force of electrostatic generated between the vibration plate and the electrode while the vibration plate and the electrode are provided facing each other.

When the ink of the present disclosure is used for a non-porous substrate, images having a high level of gloss and image robustness can be produced.

The non-porous substrate in the present disclosure has a surface with low moisture permeability, absorbency, and/or adsorptive property and includes a material having myriad of hollow spaces inside but not open to the exterior, To be more quantitative, the substrate has a water-absorption amount of 10 mL/m$^2$ or less between the initiation of contact and 30 msec$^{1/2}$ thereafter according to Bristow method.

Of the non-porous substrates, plastic film such as vinyl chloride resin film, PET film, and polycarbonate film and propylene are particularly suitable. Also, the ink demonstrates good performance on other non-porous substrates and conventionally-used porous media such as plain paper and inorganic material coated porous media.

The ink of the present disclosure can be used to print high quality images on non-porous media. However, it is more preferable to include a heating process after printing because images with higher quality, better abrasion resistance, and good attachability are formed under high perfoimance conditions.

As the heating device (heater), many known heating devices can be used. Specific examples thereof include, but are not limited to, devices for forced-air heating, radiation heating, conduction heating, or microwave drying. These can be used alone or in combination of two or more thereof.

The heating temperature can be changed depending on the kind and amount of a water-soluble organic solvent contained in ink and the lowest layer forming temperature of an added resin emulsion. It also can be changed depending on the kind of printed substrate.

The heating temperature is preferably high in terms of drying property and film-forming temperature. However, if the heating temperature is too high, a substrate on which an image is printed is damaged or even an ink head is heated, thereby causing non-discharging of ink. This is not preferable.

The heating temperature is preferably 40-120 degrees C. and more preferably 50-90 degrees C.

An embodiment of the inkjet recording device capable of recording with the ink of the present disclosure is described with reference to the accompanying drawings. In this description, paper is used but images can also be recorded similarly on other porous substrates and non-porous substrates. Furthermore, the inkjet recording device includes a serial type (shuttle type) in which a carriage scans and a line type having a line type head. FIG. 1 is a schematic diagram illustrating an example of a serial type inkjet recording device.

An inkjet recording device 101 has a sheet feeder tray 102, a sheet ejection tray 103, and an ink cartridge installation unit 104, which are mounted to the inkjet recording device 101. On the upper surface of the ink cartridge installation unit 104 is arranged an operating portion 105 including operation keys, a display, etc. The ink cartridge installation unit 104 has a front cover 115 that is openable and closable to detach and attach an ink cartridge 201. The reference numeral 111 represents an upper cover and, 112, the front surface of the front cover.

Figure 2:
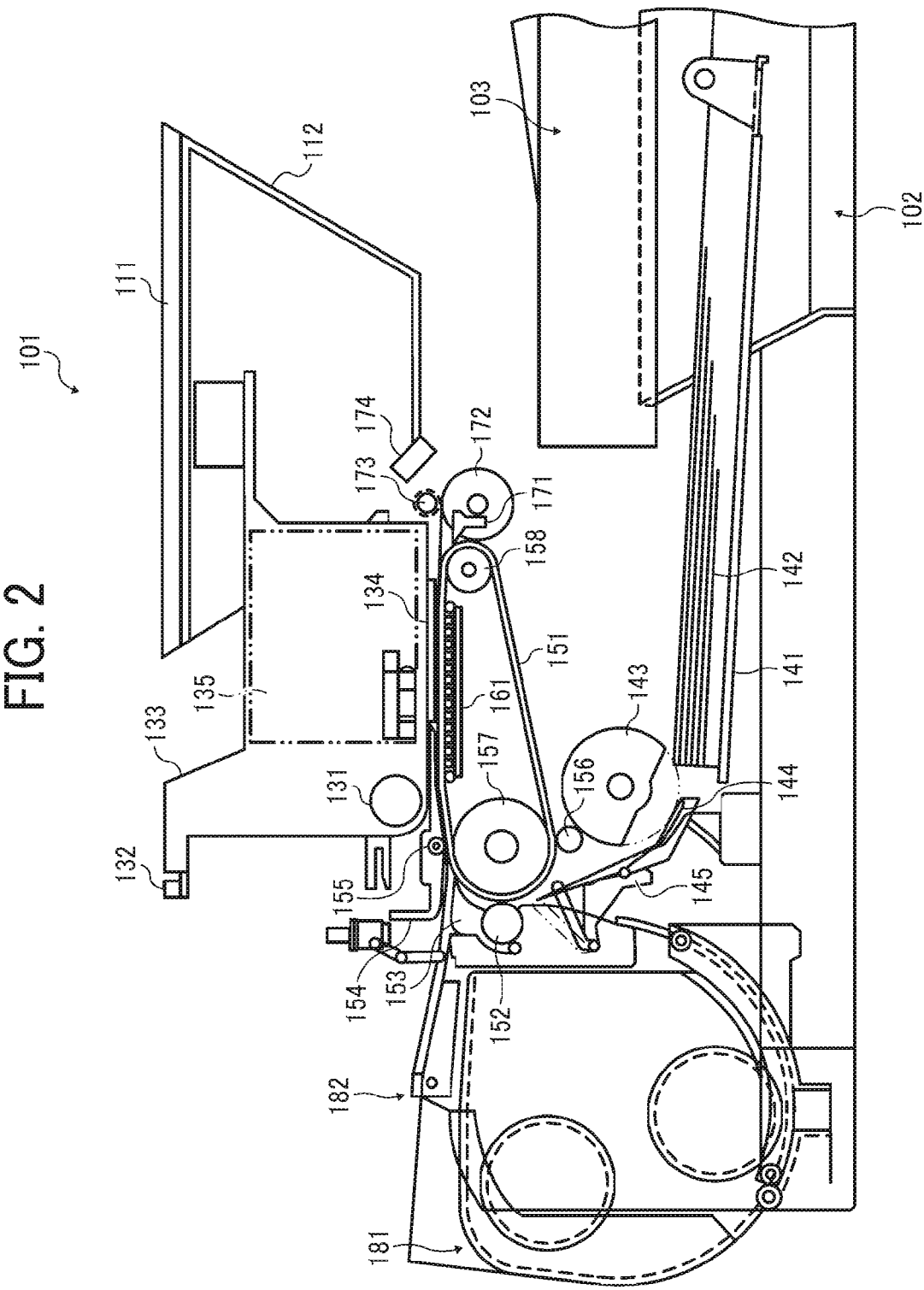
FIG. 2 is a schematic diagram illustrating the configuration of the device illustrated in FIG. 1.

Inside the inkjet recording device 101, as illustrated in FIG. 2, a guide rod 131 serving as a guiding member that laterally bridges side plates provided on the right side and left side and a stay 132 hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to eject (discharge) an ink such as a piezoelectric actuator such as a piezoelectric element, a thermal actuator that utilizes the phase change caused by film boiling of liquid by using an electric heat conversion element such as a heat element, a shape-memory alloy actuator that uses the metal phase change due to the temperature change, and an electrostatic actuator that uses an electrostatic force.

The carriage 133 has sub tanks 135 for colors to supply each color ink to the recording head 134. The ink of the present disclosure is supplied and replenished to the sub tank 135 from the ink cartridge 200 mounted onto the ink cartridge installation unit 104 via a tube for ink supply.

A sheet feeding unit to feed a substrate 142 loaded on a substrate loader (pressure plate) 141 of the sheet feeder tray 102 includes a half-moon shape roller (sheet feeding roller) 143 to separate and feed the substrate 142 one by one from the substrate loader 141 and a separation pad 144. The separation pad 144 faces the sheet feeding roller 143 and is made of a material having a large friction index and biased towards the sheet feeding roller 143.

A transfer unit to transfer the substrate 142 fed from the sheet feeding unit below the recording head 134 includes a transfer belt 151 to electrostatically adsorb and transfer the substrate 142, a counter roller 152 to transfer the substrate 142 fed from the sheet feeding unit via a guide 145 while pinching the substrate 142 with the transfer belt 151, a transfer guide 153 by which the substrate 142 moves on the transfer belt 151 by changing the transfer direction of the substrate 142 being sent substantially vertically upward by substantially 90 degrees, a front end pressure roller 155 biased towards the transfer belt 151 by a pressing member 154, and a charging roller 156 to charge the surface of the transfer belt 151.

The transfer belt 151 has an endless form, stretched between a transfer roller 157 and a tension roller 158 and is rotatable in the belt transfer direction. This transfer belt 151 has, for example, a top layer serving as a non-porous substrate adsorption surface made of a resin material such as a copolymer (ETFE) of tetrafluoroethylene and ethylene with no resistance treatment having a thickness about 40 μm, and a bottom layer (intermediate resistance layer, earth layer) made of the same material as that for the top layer with resistance treatment with carbon. On the rear side of the transfer belt 151, a guiding member 161 is disposed corresponding to the printing area by the recording head 134. An ejection unit to eject the substrate 142 on which images are recorded by the recording head 134 includes a separation claw 171 to separate the substrate 142 from the transfer belt 151, a sheet-ejection roller 172, and a sheet ejection roller 173. The substrate 142 is dried by heat wind by a fun heater 174 and thereafter output to a sheet ejection tray 103 located below the sheet-ejection roller 172.

A duplex printing sheet feeding unit 181 is mounted in a detachable and attachable manner to the rear side of the inkjet recording device 101.

The duplex printing sheet feeding unit 181 takes in and reverses the substrate 142 that is returned by the reverse rotation of the transfer belt 151 and feeds it again between the counter roller 152 and the transfer belt 151. A bypass sheet feeding unit 182 is provided on the upper surface of the duplex printing sheet feeding unit 181

In this inkjet recording device, the substrate 142 is separated and fed from the sheet feeding unit one by one substantially vertically upward, guided by the guide 145, and transferred while being pinched between the transfer belt 151 and the counter roller 152. Furthermore, the front end of the substrate 142 is guided by the transfer guide 153 and pressed against the transfer belt 151 by the front end pressure roller 155 to change the transfer direction substantially 90 degrees. Since the transfer belt 151 is charged by the charging roller 156 at this point in time, the substrate 142 is electrostatically adsorbed to the transfer belt 151 and transferred.

By driving the recording head 134 in response to the image signal by moving the carriage 133, the ink droplet is discharged to the substrate 142 not in motion to record an image in an amount of one line and thereafter the substrate 142 is transferred in a predetermined amount to be ready for the recording for the next line. On receiving a signal indicating that the recording has completed or the rear end of the substrate 142 has reached the image recording area, the recording operation stops and the substrate 142 is ejected to the sheet-ejection tray 103.

Application of the ink of the present disclosure is not limited to inkjet recording method and is possible in other recording methods. Specific examples of such recording methods include, but are not limited to, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, and a die coating method.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto. "Parts" in Examples represent "parts by weight".

Preparation of Black Pigment Dispersion A 100 g of carbon black (Black Pearls™ 1000, BET specific surface area: 343 m$^2$/g. DBPA. 105 mL/100 g, manufactured by Cabot Corporation) was added to 3,000 mL of 2.5 N sodium hypochlorite followed by stirring at 300 rpm at 60 degrees C. Subsequent to reaction for ten hours for oxidation, a pigment in which a carboxylic acid group was placed on the surface of carbon black was obtained.

The reaction liquid was filtrated and the thus-filtered carbon black was neutralized by sodium hydroxide solution followed by ultra-filtration.

Thereafter, subsequent to ultrafiltration by dialysis membrane using the pigment dispersion and deionized water followed by ultrasonic dispersion, black pigment dispersion having a solid portion concentrated to 20 percent was obtained.

Preparation of Cyan Pigment Dispersion

A cyan pigment dispersion was obtained in the same manner as in the preparation of black pigment dispersion except that Pigment Blue 15:4 (SMART Cyan 3154BA manufactured by Sensient Technologies Corporation) was used instead of carbon black.

Preparation of Magenta Pigment Dispersion

A magenta pigment dispersion was obtained in the same manner as in the preparation of black pigment dispersion except that Pigment Red 122 (Pigment Red 122, manufactured by Sun Chemical Corporation) as used instead of carbon black.

Preparation of Yellow Pigment Dispersion

A yellow pigment dispersion was obtained in the same manner as in the preparation of black pigment dispersion except that Pigment Yellow 74 (SMART Yellow 3074BA, manufactured by Sensient Technologies Corporation) was used instead of carbon black.

Preparation of Polyolefin-Modified Polyester-based Urethane Resin Emulsion A 618 parts of polyester diol 1 synthesized in the same manner as disclosed in Synthesis Example 1 of Japanese Unexamined Patent Application Publication No. H10-72562, 19 parts of 1,4-butane diol, 102 parts of dimethyl propionic acid, 290 parts of isophorone diisocyanate (IPDI), and 670 parts of acetone were placed in a pressure polymerization vessel equipped with a thermometer and a stirrer to conduct reaction at 80 degrees C. for 10 hours under stirring to obtain an acetone solution of a polyurethane resin having an NCO distal end containing NCO in an amount of 0.20 percent. This acetone solution was cooled down to 30 demes C and thereafter, 42 parts of 28 percent ammonium water was added to the acetone solution. Next, 1,515 parts of water was added to the acetone solution. Acetone was removed therefrom at 50-60 degrees C. under a reduced pressure to obtain a polyurethane resin liquid dispersion having a solid portion of 40.0 percent and a viscosity of 660 cP/25 degrees. The number average molecular weight of this resin was 15,000 as measured by gel permeation chromatography (GPC). The thus-obtained resin emulsion was subject to dispersion treatment by a paint conditioner (speed adjustable in the range of 50-1,425 rpm, manufactured by Red Devil, Inc.) to obtain a polyester-based urethane resin A having a polyolefin portion having a volume average particle diameter of 32 nm as measured by a particle size analyzer (Microtrac MODEL UPA 9340, manufactured by NIKKISO CO., LTD.).

Preparation of Polyether-based Urethane Resin Emulsion B Containing Polyolefin Portion 166.91 g of a copolymer of ethylene and propylene having an ethylene component of 48 mol percent, Mn of 3,600 g/mol, and Mw/Mn of 1.65 was placed in a separable flask equipped with a stirrer, a dripping funnel with two pressure equalizers, a thermometer, and a water-cooling condenser to conduct nitrogen replacement.

Thereafter, the system was heated to 160 degrees C. At the same temperature, 490.60 g of weighed LIGHT ACRYLATE HOB-A (2-hydroxybutyl aciylate, manufactured by Kyoeisha Chemical Co., Ltd.) in the dripping funnel and 10.71 g of di(tert-butyl) peroxide (manufactured by KATAYAMA CHEMICAL LTD.) were dripped in two hours.

After dripping, subsequent to two-hour reaction at 160 degrees C., the system was heated to 170 degrees C. and subject to three-hour reduced-pressure treatment under the condition of 170 degrees C. and 1.33 kPa to obtain polyol A containing polyolefin portion.

Thereafter, 1,500 g of polyester polyol (POLILIGHT OD-X-2420, manufactured by DIC Corporation), 200 g of polyolefin-modified polyol, 220 g of 2,2-dimethyl propionic acid (DMPA), and 1,347 g of N-methyl pyrolidone (NMP) were charged in a reaction container equipped with a stirrer, a reflux cooling tube, and a thermometer in a nitrogen atmosphere followed by heating to 60 degrees C. to dissolve DMPA. Thereafter, 1,445 g of 4,4'dicyclohexyl methane diisocyanate and 2.6 g of dibutyl tin laurylate (catalyst) were added thereto and the resultant was heated to 90 degrees C. to complete urethanation reaction in five hours. As a resultant, a urethane prepolymer having an isocyanate group at its distal end was obtained. This reaction mixture was cooled down to 80 degrees C. and 149 g of triethyl amine was admixed therewith. 4,340 g of the resultant mixture was extracted and charged in a liquid mixture of 5,400 g of water and 15 g of triethyl amine under vigorous stirring. Thereafter, 1,500 g of ice was charged into the resultant and 626 g of 35 percent 2-methyl-1,5-pentane diamine aqueous solution was added to conduct chain elongation reaction followed by distillation away of the solvent in such a trimmer that the solid portion concentration was 30 percent. Thereafter, the resultant was subject to the same dispersion treatment as in the preparation of the resin emulsion A to obtain polyester-based urethane resin emulsion B having a polyolefin portion having a volume average particle diameter of 121 nm.

Preparation of Polyether-Based Urethane Resin Emulsion Containing Polyolefin Portion A polyolefin-modified polyether-based urethane resin emulsion having a volume average particle diameter of 58 nm was obtained in the same manner as in the preparation of the resin emulsion B except that polyetherpolyol (HI- FLEX D2000, manufactured by DKS Co. Ltd.) was used instead of POLILIGHT OD-X-2420 (manufactured by DIC Corporation).

Preparation of Polyester-Based Urethane Resin Emulsion

A polyester-based urethane resin emulsion having a volume average particle diameter of 44 nm was obtained in the same manner as in the preparation of the resin emulsion B except that no polyolefin-modified polyol A was used at all in the prepolymer production reaction of the resin emulsion B.

Preparation of Polyolefin Resin Emulsion

A propylene-based random copolymer (propylene:ethylene=96:4) prepared using a metallocene catalyst as a polymerization catalyst was supplied to a twin-shaft extruder having a barrel temperature of 35 degrees C. to conduct thermal degradation to obtain degraded propylene-based random copolymer.

100 parts of the degraded propylene-based random copolymer, 4 parts of methyl methacrylate, 4 parts of ethylhexyl acrylate, and 3 parts of dicumyl peroxide were sufficiently mixed in advance and thereafter supplied to the twin-shaft extruder to conduct reaction under the condition of detention time of live minutes at a rotation speed of 300 rpm and a barrel temperature of 120 degrees C. (first barrel and second barrel), 180 degrees C. (third barrel and fourth barrel), 100 degrees C. (fifth barrel), and 130 degrees C. (sixth to eighth barrel) to obtain an acrylic acid ester and polyolefin-based copolymer.

200 g of the thus-obtained acrylic acid ester and polyolefin-based copolymer, 35 g of a surfactant (polyoxyethylene alkylamine), 8 g of stearyl glycidyl ether, and 36 g of toluene were charged into a flask equipped with a stirrer, a condenser, a thermometer, and a dripping funnel. These were mixed and kneaded for 30 minutes at 120 degrees C.

Thereafter, 8 g of 2-amino-2-methyl-1-propanol was added in five minutes and held for five minutes and 970 g of highly pure water heated to 90 degrees C. was added in 40 minutes.

After toluene was distilled away due to a reduced pressure treatment, the system was gradually cooled down to room temperature while being stirred. The amount of moisture was adjusted in such a manner that the density of the solid portion was 40 percent. A polyolefin resin emulsion having a volume average particle diameter of 140 nm was obtained in the same manner as in the resin emulsion A.

Preparation of Acrylic Resin Emulsion 900 g of deionized water and 1 g of sodiwn lauryl sulfate were charged in a reaction container equipped with a stirrer, a reflux condenser, a dripping device, and a thermometer and heated to 70 degrees C. while replacing nitrogen under stirring.

While keeping the temperature inside at 70 degrees C., 4 g of potassium persulfate was added as a polymerization initiator and dissolved. An emulsified material preliminarily prepared by stirring 450 g of deionized water, 3 g of sodium lauryl sulfate, 20 g of acrylamide, 365 g of styrene, 545 g of butyl acrylate, and 10 2 of methacrrylic acid was continuously dripped to the reaction solution in four hours.

After dripping, the resultant was aged for three hours,

After the thus-obtained aqueous solution was cooled down to room temperature, deionized water and sodium hydroxide were added to have a solid portion of 30 percent by mass and a pH of 8. The resultant was mixed, stirred, and dispersed in the same manner as in the resin emulsion A to obtain an acrylic resin emulsion having a volume average particle diameter of 100 nm.

Preparation of Ink Examples 1-15 and Ink Comparative Examples 1-9

Each ink was prepared according to the prescription shown in Table 1.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Black pigment liquid dispersion | 20 |  |  |  | 20 | 20 | 20 | 20 | 20 |
| Cyan pigment liquid dispersion |  | 20 |  |  |  |  |  |  |  |
| Magenta pigment liquid dispersion |  |  | 20 |  |  |  |  |  |  |
| Yellow pigment liquid dispersion |  |  |  | 20 |  |  |  |  |  |
| Olefin-modified polyester-based urethane resin A | 15 |  | 15 | 7.5 | 15 | 15 | 15 | 15 | 15 |
| Olefin-modified polyester-based urethane resin B |  | 15 |  | 7.5 |  |  |  |  |  |
| Olefin-modified polyether-based urethane resin |  |  |  |  |  |  |  |  |  |
| Polyester-based urethane resin |  |  |  |  |  |  |  |  |  |
| Polyolefin resin |  |  |  |  |  |  |  |  |  |
| Acrylic resin |  |  |  |  |  |  |  |  |  |
| BY16-201 | 1.5 |  |  |  | 0.04 | 0.08 | 0.5 | 3.1 | 5.1 |
| BYK-333 |  | 0.2 |  |  |  |  |  |  |  |
| WET-250 |  |  | 2 |  |  |  |  |  |  |
| KF-351A |  |  |  | 3 |  |  |  |  |  |
| FS-300 |  |  |  |  |  |  |  |  |  |
| EP-5035 |  |  |  |  |  |  |  |  |  |
| 1,2-propane diol | 30 |  |  | 10 | 30 | 30 | 30 | 30 | 30 |
| 1,2-butane diol |  | 30 |  | 10 |  |  |  |  |  |

TABLE 1-continued

| | Example 10 | Example 11 | Example 12 | Example 13 | Example 14 | Example 15 | Example 16 | Example 17 |
|---|---|---|---|---|---|---|---|---|
| 2,3-butane diol | | | 30 | 10 | | | | |
| 1,4-butane diol | | | | | | | | |
| 3-methyl-1,3-butane diol | | | | | | | | |
| PROXEL LV (manufactured by AVECIA GROUP | 0.1 | 0.1 | 0.1 | 0.1 | 0.1 | 0.1 | 0.1 | 0.1 |
| Deionized water | Rest | Rest | Rest | Rest | Rest | Rest | Rest | Rest |
| Total amount | 100 | 100 | 100 | 100 | 100 | 100 | 100 | 100 |

| | Example 10 | Example 11 | Example 12 | Example 13 | Example 14 | Example 15 | Example 16 | Example 17 |
|---|---|---|---|---|---|---|---|---|
| Black pigment liquid dispersion | 20 | | 20 | 20 | | 20 | 20 | 20 |
| Cyan pigment liquid dispersion | | | | | | | | |
| Magenta pigment liquid dispersion | | | | | | | | |
| Yellow pigment liquid dispersion | | | | | | | | |
| Olefin-modified polyester-based urethane resin A | 0.4 | 3 | 33 | 50 | 15 | 15 | 15 | 15 |
| Olefin-modified polyester-based urethane resin B | | | | | | | | |
| Olefin-modified polyether-based urethane resin | | | | | | | | |
| Polyester-based urethane resin | | | | | | | | |
| Polyolefin resin | | | | | | | | |
| Acrylic resin | | | | | | | | |
| BY16-201 | 1.5 | 1.5 | 1.5 | 1.5 | 1.5 | 1.5 | 1.5 | 1.5 |
| BYK-333 | | | | | | | | |
| WET-250 | | | | | | | | |
| KF-351A | | | | | | | | |
| FS-300 | | | | | | | | |
| EP-5035 | | | | | | | | |
| 1,2-propane diol | 20 | 30 | 30 | 30 | 30 | | | |
| 1,2-butane diol | | | | | | | | |
| 2,3-butane diol | | | | | | | | |
| 1,4-butane diol | | | | | | 30 | | |
| 3-methyl-1,3-butane diol | | | | | | | 30 | 30 |
| PROXEL LV (manufactured by AVECIA GROUP | 0.1 | 0.1 | 0.1 | 0.1 | 0.1 | 0.1 | 0.1 | 0.1 |
| Deionized water | Rest | Rest | Rest | Rest | Rest | Rest | Rest | Rest |
| Total amount | 100 | 100 | 100 | 100 | 100 | 100 | 100 | 100 |

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Black pigment liquid dispersion | 20 | 20 | 20 | 20 | 20 | 20 | 20 |
| Cyan pigment liquid dispersion | | | | | | | |
| Magenta pigment liquid dispersion | | | | | | | |
| Yellow pigment liquid dispersion | | | | | | | |
| Olefin-modified polyester-based urethane resin A | 15 | 15 | | | | | |
| Olefin-modified polyester-based urethane resin B | | | | | | | |
| Olefin-modified polyether-based urethane resin | | | 15 | | | | |
| Polyester-based urethane resin | | | | 15 | | | |
| Polyolefin resin | | | | | 15 | | |
| Acrylic resin | | | | | | | 15 |

TABLE 1-continued

| | | | | | | | |
|---|---|---|---|---|---|---|---|
| BY16-201 | | | 1.5 | 1.5 | 1.5 | 1.5 | 1.5 |
| BYK-333 | | | | | | | |
| WET-250 | | | | | | | |
| KF-351A | | | | | | | |
| FS-300 | 1.5 | | | | | | |
| EP-5035 | | 1.5 | | | | | |
| 1,2-propane diol | 30 | 30 | 30 | 30 | 30 | 30 | 30 |
| 1,2-butane diol | | | | | | | |
| 2,3-butane diol | | | | | | | |
| 1,4-butane diol | | | | | | | |
| 3-methyl-1,3-butane diol | | | | | | | |
| PROXEL LV (manufactured by AVECIA GROUP | 0.1 | 0.1 | 0.1 | 0.1 | 0.1 | 0.1 | 0.1 |
| Deionized water | Rest | Rest | Rest | Rest | Rest | Rest | Rest |
| Total amount | 100 | 100 | 100 | 100 | 100 | 100 | 100 |

Details of each composition of the ink in Table 1 are as follows.

* BY16-201: Bi-functional carbinol-modified silicone having alcoholic hydroxyl groups at both distal ends of a straight chain polymer manufactured by Dow Corning Toray Co., Ltd.
* BYK-333: Polyether-modified polysiloxane-based surfactant, manufactured by BYK Japan KK. HLB = 12.
* WET-250: Polyether-modified siloxane copolymer, manufactured by Evonik Degussa Japan Co., Ltd. Substrate wetting agent.
* KF-351A: Polysiloxane-based surfactant, manufactured by Shin-Etsu Chemical Co., Ltd.
* FS-300, Fluorine-containing surfactant: ZONYL FS-300 (effective component: 40 percent), manufactured by E. I. du Pont de Nemours and Company.
* EP-5035: Nonion-based surfactant, manufactured by Nippon Shokubai Co., Ltd.
* PROXEL LV: Preservatives and fungicides, manufactured by AVECIA GROUP Evaluation of Ink Each ink was evaluated as follows. The results are shown in Table 2.

To evaluate the ink of Example 14, the drying condition of 80 degrees C. for one hour in Example 1 was changed to natural drying at room temperature.

Taking into account outdoor use, evaluation about substrate attachability was conducted by a general method assuming outdoor use. Judging from the evaluation results, the ink of the present disclosure is found to be suitable for outdoor use.

Evaluation on Blurring

An inkjet printer (IPSiO GXe5500, manufactured by Ricoh Company Ltd.) was filled with each manufactured ink and an image sample having monochrome texts with no backgrowid was printed on each film of PVC, PET, and PP. Thereafter, the image sample was dried at 80 degrees C. for one hour.

The size of the recorded texts was set to 11 points with MS gothic font and the sample was evaluated according to the following criteria.
A: Almost no blurring observed with clear texts
B: Blurring slightly observed with texts sufficiently readable
C: Blurring clearly observed with texts readable
D: Blurring clearly observed with texts difficult to read Evaluation on Solid Filling An inkjet printer (IPSiO GXe5500, manufactured by Ricoh Company Ltd) was filled with each manufactured ink and a solid image was printed on each film of PVC, PET, and PP followed by drying at 80 degrees C. for one hour.

The solid image was observed with a microscope (VHX-200, manufactured by KEYENCE CORPORATION under the magnifying power of 20× to measure the ink attached area excluding the area where no ink was attached in the observation image. The ink attached area was evaluated by the following criteria.
A: Ink attached area greater than 97%
B: Ink attached area greater than 95% to 97%
C: Ink attached area between 92% and 95%
D: Ink attached area less than 92%

Evaluation on Abrasion Resistance of Image

An inkjet printer (IPSiO GXe5500, manufactured by Ricoh Company Ltd.) was filled with each manufactured ink and a solid image was printed on PP film followed by drying at 80 degrees C. for one hour.

Thereafter, the solid portion was abraded by dried cotton (unbleached muslin No. 3) with a load of 400 g and evaluated about abrasion (friction) resistance according to the following criteria:
A: No change in image when abraded 50+ times
B: Slight scratch observed when abraded 50 times but having no impact on image density or practical use
C: Image density degraded when abraded 31 times to 50 times
D: Image density degraded when abraded 11 times to 30 times
E: Image density degraded when abraded 10– times The manufacturers and the grades of each film used in the substrate attachability test are as follows,
PVC: D-JET2, manufactured by 3M Company
PET: ESPET® E5100, manufactured by TOYOBO CO., LTD.
PP: PYLEN® P2102, manufactured by TOYOBO CO., LTD.

TABLE 2

| Evaluation item | Substrate | Example 1 | Example 2 | Example 3 | Example 4 | Example 5 | Example 6 | Example 7 | Example 8 | Example 9 |
|---|---|---|---|---|---|---|---|---|---|---|
| Blurring | PVC | A | A | A | A | A | A | A | B | B |
| | PET | A | A | A | A | A | A | A | B | B |
| | PP | A | A | A | A | A | A | A | A | B |

TABLE 2-continued

| Evaluation item | Substrate | | | | | | | | | |
|---|---|---|---|---|---|---|---|---|---|---|
| Solid filling | PVC | A | A | A | A | B | A | A | A | A |
|  | PET | A | A | A | A | B | B | A | A | A |
|  | PP | A | A | A | A | B | B | A | A | A |
| Image robustness | PP | A | A | A | A | A | A | A | A | B |
| Memo (Heating after printing) |  | Heated to 80° C. | Heated to 80° C. | Heated to 80° C. | Heated to 80° C. | Heated to 80° C. | Heated to 80° C. | Heated to 80° C. | Heated to 80° C. | Heated to 80° C. |

| Evaluation item | Substrate | Example 10 | Example 11 | Example 12 | Example 13 | Example 14 | Example 15 | Example 16 | Example 17 |
|---|---|---|---|---|---|---|---|---|---|
| Blurring | PVC | A | A | A | A | A | A | A | A |
|  | PET | A | A | A | A | A | A | B | B |
|  | PP | A | A | A | A | A | A | A | A |
| Solid Filling | PVC | A | A | B | B | A | A | A | A |
|  | PET | A | A | B | B | A | A | A | A |
|  | PP | C | B | A | B | A | A | A | A |
| Image robustness | PP | B | B | A | A | C | A | B | B |
| Memo (Heating after printing) |  | Heated to 80° C. | Heated to 80° C. | Heated to 80° C. | Heated to 80° C. | Heated to 80° C. | Natural drying | Heated to 80° C. | Heated to 80° C. | Heated to 80° C. |

| Evaluation item | Substrate | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Blurring | PVC | C | A | A | A | A | A | B |
|  | PET | D | A | A | A | A | B | C |
|  | PP | B | A | A | A | D | A | B |
| Solid filling | PVC | A | D | A | A | A | A | A |
|  | PET | A | D | A | A | A | A | A |
|  | PP | A | C | C | D | A | D | D |
| Image robustness | PP | A | A | D | E | E | E | E |
| Memo (Heating after printing) |  | Heated to 80° C. | Heated to 80° C. | Heated to 80° C. | Heated to 80° C. | Heated to 80° C. | Heated to 80° C. | Heated to 80° C. |

Examples 1-4 are particularly preferable in the present disclosure and found to meet a balance between blurring and solid filling for various substrates and secure robustness.

The fluorosurfactant was used in Comparative Example 1. Blurring was particularly severe for PVC and PET. Texts were not readable on PET.

A hydrocarbon-based surfactant was used in Comparative Example 2. The solid image was not filled with the ink well, which was easily noticed.

The urethane resins using olefin-modified ether-based urethane and non-modified polyester-based urethane were used in Comparative Examples 3 and 4, respectively. Both were inferior about robustness, which was not up to practical use.

The olefin resin was used in Comparative Example 5. In addition to low level of robustness, the ink was too compatible with the PP substrate, which significantly degraded blurring.

The acrylic resin was used in Comparative Example 6. In addition to low level of robustness, the ink had no compatibility with the PP substrate, which significantly degraded solid filling.

No resin was used in Comparative Example 7. Since the pigment was just placed on the substrate, the image had no robustness or the droplets were not solidified, degrading blurring.

According to the present invention, ink is provided which has good wettability to all of the substrates of polypropylene (PP), polyvinyl chloride (PVC), and polyethylene terephthalate (PET) and printed matter of the ink also has excellent abrasion resistance.

Having now fully described embodiments of the present invention, it will be apparent to one of ordinary skill in the art that many changes and modifications can be made thereto without departing from the spirit and scope of embodiments of the invention as set forth herein.

What is claimed is:
1. An ink, comprising:
   water;
   an organic solvent comprising at least one selected from the group consisting of 1,2-propane diol, 1,2-butane diol, and 2,3-butane diol;
   a surfactant comprising a silicon-containing surfactant; and
   a resin comprising a polyolefin-modified polyester-based urethane resin.
2. The ink according to claim 1, further comprising a coloring material.
3. The ink according to claim 1, wherein the polyolefin-modified polyester-based urethane resin is particulate.
4. The ink according to claim 1, wherein the silicon-containing surfactant accounts for 0.05-5 percent by mass of a total amount of the ink.
5. The ink according to claim 1, wherein a proportion of the polyolefin-modified polyester-based urethane resin as a solid portion accounts for 1-9 percent by mass of a total amount of the ink.
6. An inkjet, comprising the ink according to claim 1.
7. An inkjet recording method comprising:
   applying thermal energy or mechanical energy to the ink of claim 1 to discharge the ink of claim 1 to a recording medium to print an image thereon.

8. The inkjet recording method according to claim 7, further comprising heating the recording medium after the image is printed.

9. An inkjet recorded matter comprising:
a coloring material;
a silicon-containing surfactant; and
a polyolefin-modified polyester-based urethane resin,
wherein the inkjet recorded matter is formed by an inkjet recording method comprising applying thermal energy or mechanical energy to the ink of claim 1 to discharge the ink of claim 1 to a recording medium to print an image thereon.

10. The ink according to claim 1, wherein the silicon-containing surfactant is a polyether-modified polysiloxane compound.

* * * * *